US008807921B2

(12) United States Patent
Struziak

(10) Patent No.: US 8,807,921 B2
(45) Date of Patent: Aug. 19, 2014

(54) JOURNAL AIR BEARING FOR SMALL SHAFT DIAMETERS

(75) Inventor: Ronald M. Struziak, Longmeadow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 718 days.

(21) Appl. No.: 13/079,312

(22) Filed: Apr. 4, 2011

(65) Prior Publication Data

US 2012/0251300 A1  Oct. 4, 2012

(51) Int. Cl.
*F01D 25/16* (2006.01)
*F16C 32/06* (2006.01)
*F16C 17/02* (2006.01)
*F04D 29/057* (2006.01)
*F04D 29/051* (2006.01)
*F04D 29/063* (2006.01)

(52) U.S. Cl.
CPC ............ *F04D 29/057* (2013.01); *F16C 17/024* (2013.01); *F04D 29/0513* (2013.01); *F04D 29/063* (2013.01)
USPC ........ 415/110; 415/112; 415/113; 415/170.1; 415/180; 415/229; 29/888; 364/103; 364/104; 364/106

(58) Field of Classification Search
CPC . F04D 29/0513; F04D 29/063; F04D 29/057; F16C 17/024
USPC .............. 415/110, 111, 112, 113, 170.1, 180, 415/229; 29/888; 384/103, 104, 106
See application file for complete search history.

(56) References Cited

U.S. PATENT DOCUMENTS

| | | | |
|---|---|---|---|
| 5,536,087 A | 7/1996 | Rao et al. | |
| 5,540,505 A | 7/1996 | Struziak | |
| 5,547,286 A | 8/1996 | Struziak | |
| 5,634,723 A * | 6/1997 | Agrawal | 384/106 |
| 5,658,079 A | 8/1997 | Struziak et al. | |
| 5,921,683 A | 7/1999 | Merritt et al. | |
| 6,964,522 B2 * | 11/2005 | Kang et al. | 384/103 |
| 7,056,025 B2 | 6/2006 | Nakata | |
| 7,070,330 B2 * | 7/2006 | Agrawal | 384/106 |
| 7,140,839 B2 | 11/2006 | McAuliffe et al. | |
| 7,553,086 B2 * | 6/2009 | Kang et al. | 384/103 |
| 7,648,279 B2 | 1/2010 | Struziak et al. | |
| 7,648,280 B2 | 1/2010 | Struziak et al. | |
| 8,029,194 B2 * | 10/2011 | Agrawal et al. | 384/106 |
| 8,419,283 B2 * | 4/2013 | McAuliffe et al. | 384/103 |
| 2008/0260308 A1 | 10/2008 | Struziak et al. | |

* cited by examiner

*Primary Examiner* — Igor Kershteyn
(74) *Attorney, Agent, or Firm* — Carlson, Gaskey & Olds, PC

(57) ABSTRACT

A bearing foil assembly includes a top foil, an intermediate foil, and a bump foil. The bump foil is provided with corrugations at circumferentially spaced locations. The bump foil has an end that is bent radially outwardly from a center of the foil assembly. The top foil has a bent portion extending radially outwardly and adjacent to the bent end of the bump foil. A first radius of curvature is defined to a curved portion leading into the bent portion at a first end adjacent to the bent end. A second radius of curvature is defined at an end of the bent portion on an end opposed to the bent end. A ratio of the first radius of curvature to the second radius of curvature is between 0.6 and 10. A bearing assembly, a shaft sub-assembly, an air machine, and a method of assembling a bearing into an air machine are also disclosed.

10 Claims, 3 Drawing Sheets

US 8,807,921 B2

JOURNAL AIR BEARING FOR SMALL SHAFT DIAMETERS

BACKGROUND

This application relates to foils for a journal bearing, which is particularly adapted for use on small shaft diameters.

Air machines are known and include a compressor which compresses air and delivers the air for a downstream use, such as an aircraft air supply system. A portion of the air from a compressor outlet passes over a turbine rotor, driving the turbine rotor to rotate.

Several shafts are included in the air machine, and include air bearings. In the prior art, it is known to utilize a plurality of foil members including a bump foil, an intermediate foil, and a top foil. Two of these foils have bent portions which extend into a key slot in a surrounding sleeve.

In the prior art, a shaft which is supported within the bearing has had a relatively large diameter.

SUMMARY

A bearing foil assembly includes a top foil, an intermediate foil, and a bump foil. The bump foil is provided with corrugations at circumferentially spaced locations. The bump foil has an end that is bent radially outwardly from a center of the foil assembly. The top foil has a bent portion extending radially outwardly and adjacent to the bent end of the bump foil. A first radius of curvature is defined to a curved portion leading into the bent portion at a first end adjacent to the bent end. A second radius of curvature is defined at an end of the bent portion on an end opposed to the bent end. A ratio of the first radius of curvature to the second radius of curvature is between 0.6 and 10.

A bearing assembly, a shaft sub-assembly, an air machine, and a method of assembling a bearing into an air machine are also disclosed.

These and other features of the present invention can be best understood from the following specification and drawings, the following of which is a brief description.

DETAILED DESCRIPTION

Figure 1:
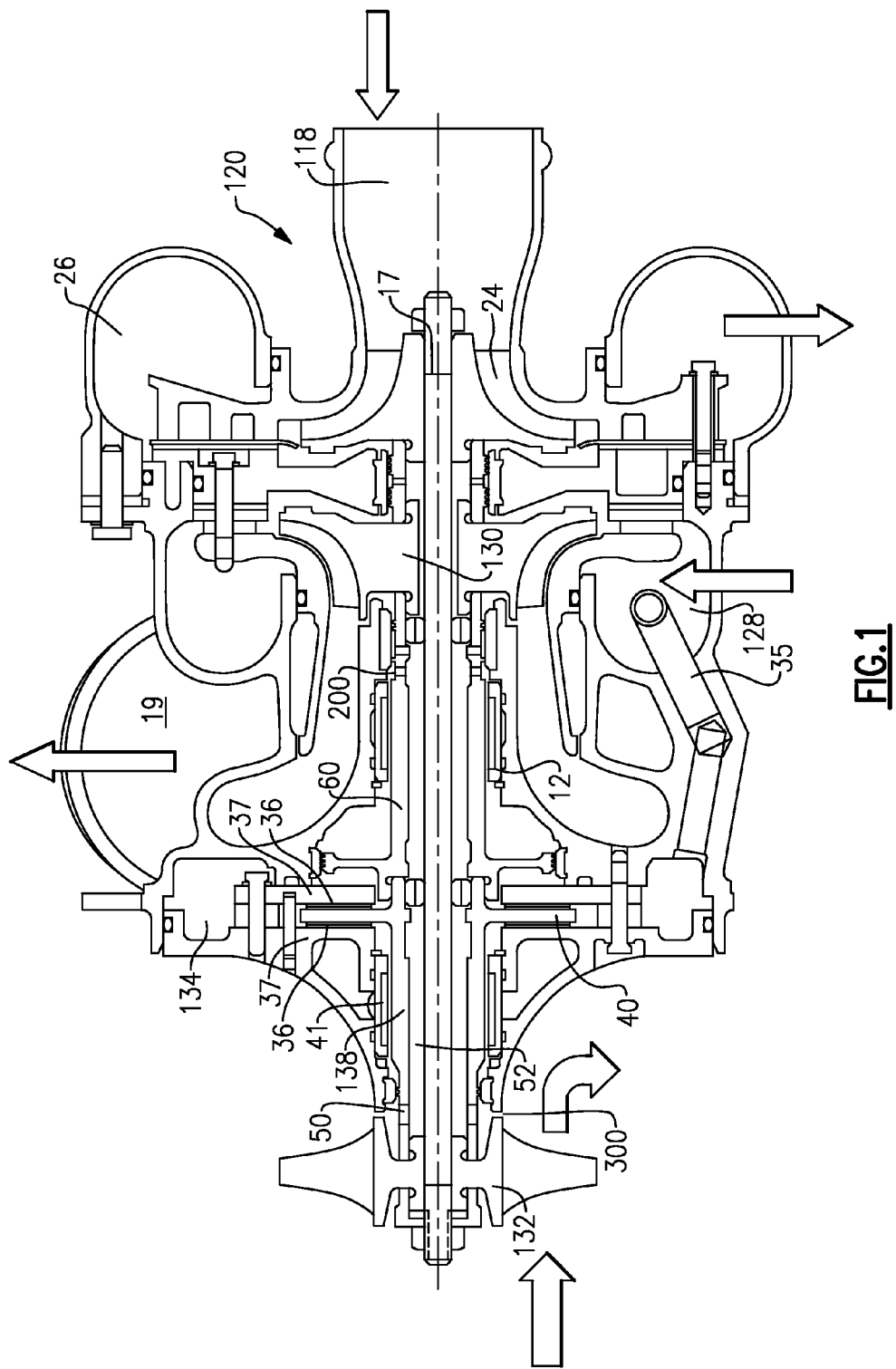
FIG. 1 shows an air machine.

As shown in FIG. 1, an air cycle machine 120 incorporates a compressor inlet 118 delivering air to a compressor rotor 24. The compressor compresses the air and delivers it toward a compressor outlet 26. The compressor outlet 26 may pass to an aircraft air supply system. In addition, a portion of the compressor outlet 26 passes into a turbine inlet 128, and drives a turbine rotor 130 to rotate. The output of the turbine passes to a turbine outlet 19, and is also used as part of an aircraft air supply system.

A tie rod 17 connects the rotors 24 and 130, and further connects to a fan rotor 132.

A cooling air inlet 35 taps air from the turbine inlet 128, and delivers it into a chamber 134. This air passes axially between thrust bearing surfaces 36 on housing portions 37, and a disk 40. Disk 40 is part of a thrust shaft 138. Air passes along both the thrust bearing surfaces 36, and a portion of the air extends to the right as shown in FIG. 1, and along the journal bearing 12. Journal bearing 12 supports turbine shaft 60. Other air passes to the left, and along the journal bearing 41. The air passing along the journal bearing 12 reaches the holes 200, and can pass into an interior 52 of the thrust shaft 138, and then outwardly of holes 50 and to the outlet 300.

Figure 2:
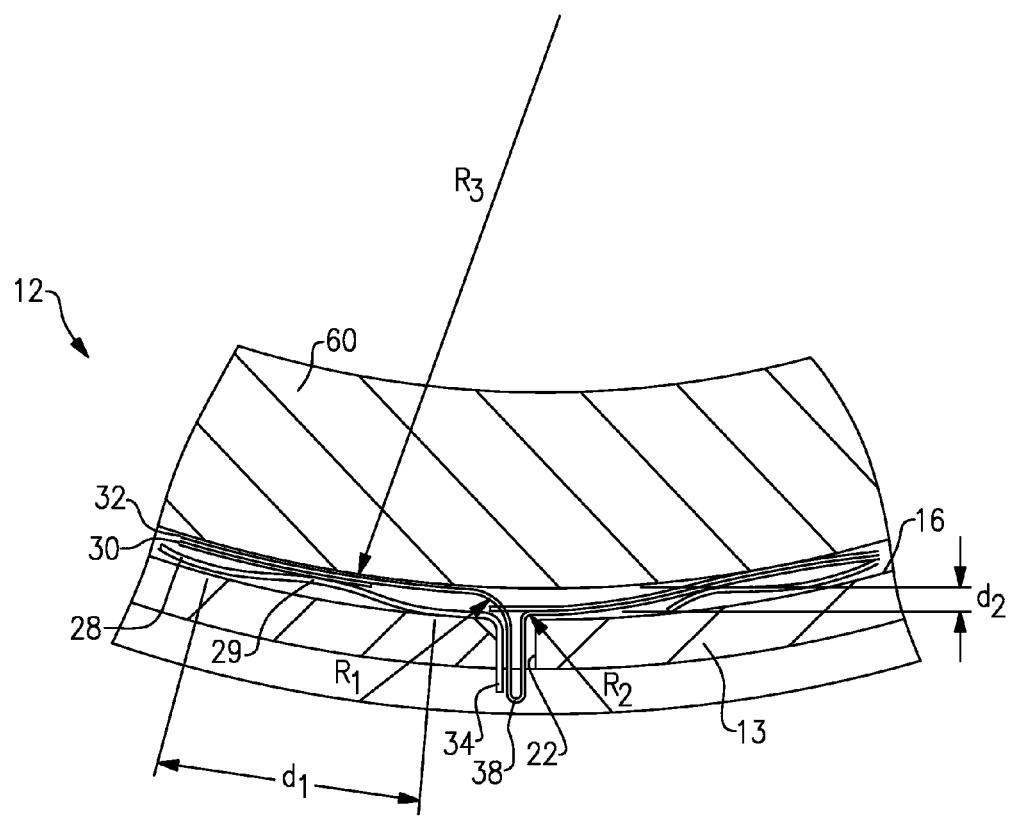
FIG. 2 shows a detail of an inventive foil assembly.

As shown in FIG. 2, the journal bearing 12 includes three foils. The foils include a bump foil 28, an intermediate foil 30 and a top foil 32. The bump foil 28, the intermediate foil 30 and the top foil 32 are each thin sheets of material (e.g., nickel-based alloys or steel) wrapped (or rolled) in a generally cylindrical shape and positioned in a bore of the journal sleeve 13 defined by a substantially cylindrical inner surface 16. The bump foil 28 is corrugated 29, allowing a working fluid or cooling fluid to flow through spaces formed between adjacent corrugations 29, or waves. The bump foil 28 is positioned adjacent to the inner surface 16 of the journal sleeve 13, and has a bent end 34 that extends radially outward at least partially into a key slot 22 in order to retain the bump foil 28 relative to the journal sleeve 13. The intermediate foil 30 is positioned adjacent to and radially inward from the bump foil 28, and the top foil 32 is positioned adjacent to and radially inward from the intermediate foil 30. The intermediate foil 30 and the top foil 32 are joined together at a bent portion 38 that extends radially outward at least partially into the key slot 22 to retain both the intermediate and top foils 30 and 32 relative to the journal sleeve 13.

Further details of known journal air bearings, and the foil assembly are disclosed for example in U.S. Pat. Nos. 7,648,279 and 7,648,280.

Figure 3:
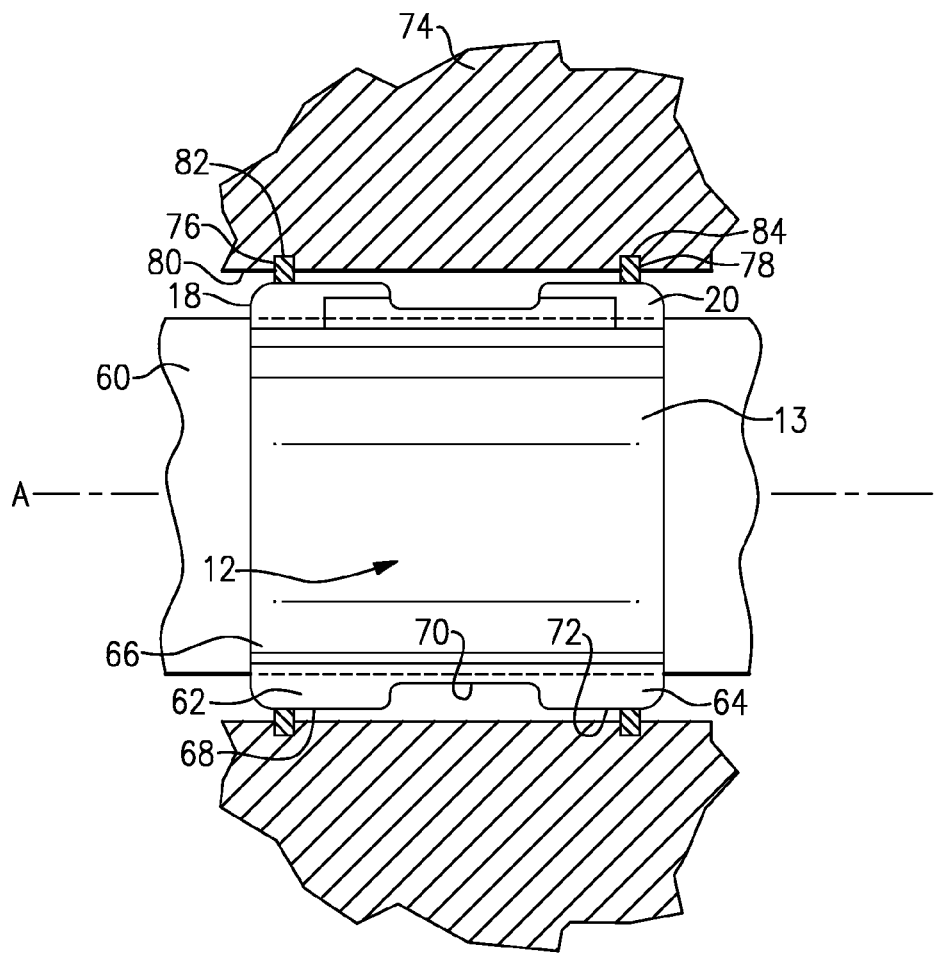
FIG. 3 shows a journal sleeve.

As shown in FIGS. 2 and 3, a shaft 60 is positioned inside the journal sleeve 13 and the foils 28, 30 and 32. During operation, the shaft 60 would rotate into a free end of the top foil 32 tending to open the wound foils (i.e., counter-clockwise with respect to the cross-section of the journal bearing 12 shown in FIG. 2). Rotation of the shaft 60 causes a working fluid to form a cushion (often referred to as an "air bearing") that supports the shaft 60 while rotating at operating speed with little or no direct contact between the shaft 60 and the top foil 32. However, contact between the shaft 60 and the top foil 32 may still occur at relatively low speed operation, such as during startup and shutdown phases, and due to incidental contact during regular operation.

The journal sleeve 13 includes a first O-ring land 62 and a second O-ring land 64, and a middle portion 70. The first O-ring land 62 is located adjacent to first end 18 of the journal sleeve 13, and the second O-ring land 64 is located adjacent to second end 20 of the journal sleeve 13. The first and second O-ring lands 62 and 64 each define a substantially cylindrical region of the outer surface of the journal sleeve 13 that is parallel to the axis A.

The journal sleeve 13 can be made of a metallic material and shaped using known techniques such as milling, turning and grinding.

A housing 74, a first O-ring 76 and a second O-ring 78 surround journal sleeve 13. The housing 74 generally defines a bore 80 in which the journal sleeve 13 is positioned. In the illustrated embodiment, the first and second O-rings 76 and 78 are engaged with the housing 74 in respective first and second engagement grooves 82 and 84. The first O-ring 76 rests against and engages the first O-ring land 62 of the journal sleeve 13, and the second O-ring 78 rests against and engages the second O-ring land 64 of the journal sleeve 13. The first and second O-rings 76 and 78 can be of a conventional type known for use with hydrodynamic fluid film journal bearing systems.

The general structure as described above is also true of the journal bearing and foil assembly as included in the prior art mentioned in the above-referenced patents. The present application is directed to a unique foil assembly which is particularly well suited to small diameter shafts.

FIG. 2 shows a foil assembly which is utilized when shaft 60 has a relatively small outer diameter. For the following discussion, it is assumed the radius of the outer diameter of the shaft 60 ($R_3$) is less than 0.5" (1.27 cm), and may be on the order of about 0.45" (1.14 cm). In embodiments, the radius may range between 0.25" and 0.5" (0.63 cm to 1.27 cm).

In this foil assembly, each corrugation, or wave form 29 has a pitch, or circumferential length, of $d_1$. This pitch distance may be about 0.143" (0.363 cm) in one embodiment, with a thickness of the bump foil of 0.004" (0.010 cm). The pitch distance may be between 0.125" to 0.178" (0.317 to 0.452 cm). The thickness of the bump foil may be between 0.003" to 0.0045" (0.008 to 0.011 cm). The thickness of the top foil may be between 0.0025" to 0.004" (0.006 to 0.010 cm).

This can be contrasted to the foil assembly for use in larger diameter shafts such as in the prior patents cited above. The prior shaft diameters were on the order of 1.25" (3.17 cm), or 1.96" (4.98 cm). In such foil assemblies, the pitch was 0.125" (0.317 cm), again for a thickness of 0.004" (0.010 cm).

In embodiments of this invention, a ratio of $d_1$ to the thickness of the bump foil 28 is between 25 and 60.

Further, a ratio of $d_1$ to the radius $R_3$ of the shaft 60 is between 0.25 and 0.70.

In addition, a dimension $d_2$ is defined from the top to intermediate foil as a wedge step. In this embodiment, this distance $d_2$ is about 0.015" (0.036 cm). The wedge step may be between 0.010" to 0.020" (0.025 to 0.050 cm).

In embodiment of this invention, a ratio of $d_2$ to $R_3$ is between 0.020 and 0.080.

In embodiments of this invention, a ratio of $d_1$ to $d_2$ is between 6 and 17.

In addition, the bent end 34 of the bump foil 28 sits adjacent a bent portion 38 which secures the top and intermediate foils 30/32 to be secured in the key slot 22. $R_1$ is defined as the radius of curvature of an end of the bent portion 38 adjacent to the bent end 34. $R_2$ is the radius of curvature of the opposed end of bent portion 38. In one embodiment, $R_1$ is 0.014" (0.035 cm) and $R_2$ is 0.010" (0.025 cm). $R_1$ may be between 0.009" and 0.020" (0.022 to 0.050 cm) and $R_2$ may be between 0.002" and 0.015" (0.005 to 0.038 cm). A ratio of $R_1$ to $R_2$ is between 0.6 and 10. In a more narrow range, the ratio of $R_1$ to $R_2$ is between 0.6 and 4.

In the prior art, the $R_1$ dimension was 0.50" (1.27 cm), while the $R_2$ dimension was 0.015" (0.038 cm).

A ratio of $R_1$ to $R_3$ was between 0.02 and 0.08 in embodiments of this invention.

The inventive dimensions result in a foil assembly that is well suited for the smaller shaft.

The hydrodynamic fluid film journal bearing 12 of the present invention can be assembled as follows. The foils 28, 30 and 32 are assembled inside the journal sleeve 13, and the first and second O-rings 76 and 78 are positioned in the engagement grooves 82 and 84, respectively, in the housing 74. The journal sleeve 13 (with the foils 28, 30 and 32 assembled therein) is then inserted into the bore 80 of the housing 74, inside the first and second O-rings 76 and 78. The first end 18 of the journal sleeve 13 can be inserted into the bore 80 first.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A bearing foil assembly comprising:
   a top foil, an intermediate foil, and a bump foil, said bump foil being provided with corrugations at circumferentially spaced locations about a center axis, said bump foil having a bent end that is bent radially outwardly from the center axis;
   said top and intermediate foils having a bent portion extending radially outwardly and adjacent to said bent end of said bump foil, and there being a first radius of curvature to a curved portion of the bent portion at a first end adjacent to said bent end, and a second radius of curvature at an end of said bent portion on an end opposed to said bent end, with a ratio of said first radius of curvature to the second radius of curvature being between 0.6 and 10;
   a pitch distance of the corrugations in the bump foil is defined, and a ratio of the pitch distance to a radius of a shaft which is to be supported within the foil assembly is between 0.25 and 0.70;
   a ratio of said pitch distance to a thickness of said bump foil is between 25 and 60;
   a wedge step distance is defined between the top and intermediate foils, a ratio of the pitch distance to the wedge step distance is between 6 and 17; and
   a ratio of the first radius of curvature to the radius of the shaft that is to be supported within the foil assembly is between 0.02 and 0.08.

2. The bearing foil assembly as set forth in claim 1, wherein the ratio of said first radius of curvature to the second radius of curvature being between 0.6 and 4.

3. A bearing assembly comprising:
   a sleeve defining a radially inner surface, said sleeve having a key slot;
   a foil assembly received within the radially inner surface, the foil assembly comprising a top foil, an intermediate foil, and a bump foil, said bump foil being provided with corrugations at circumferentially spaced locations about a center axis, said bump foil having a bent end that is bent radially outwardly from the center axis and into the key slot, said top and intermediate foils having a bent portion extending radially outwardly into the key slot, and there being a first radius of curvature to a curved portion of the top foil leading into the bent portion at a first end adjacent to said bent end, and a second radius of curvature at an end of said bent portion on an end opposed to said bent end, with a ratio of said first radius of curvature to the second radius of curvature being between 0.6 and 10;
   a pitch distance of the corrugations in the bump foil is defined, and a ratio of the pitch distance to a radius of a shaft which is to be supported within the foil assembly is between 0.25 and 0.7;
   a ratio of said pitch distance to a thickness of said bump foil is between 25 and 60;
   a wedge step distance is defined between the top and intermediate foils, a ratio of the pitch distance of the corrugation of the bum foil to this is between 6 and 17; and
   a ratio of the first radius of curvature to the radius of the shaft that is to be supported within the foil assembly is between 0.02 and 0.08.

4. The bearing assembly as set forth in claim 3, wherein the ratio of said first radius of curvature to the second radius of curvature being between 0.6 and 4.

5. A shaft sub-assembly comprising:
   a shaft supported within a journal sleeve, said journal sleeve including a foil assembly intermediate an outer periphery of said shaft and an inner periphery of said journal sleeve, said journal sleeve also including a key slot;

the foil assembly including a top foil, an intermediate foil, and a bump foil, the bump foil including a plurality of circumferentially spaced corrugations, and the bump foil having a bend end received within said key slot, said top and intermediate foils having a bent portion extending radially outwardly into said key slot, and there being a first radius of curvature to a curved portion of the bent portion at a first end adjacent to said bent end, and a second radius of curvature at an end of said bent portion on an end opposed to said bent end, with a ratio of said first radius of curvature to the second radius of curvature being between 0.6 and 10;

a pitch distance of the corrugations in the bump foil is defined, and a ratio of the pitch distance to a radius of the shaft is between 0.25 and 0.7;

a ratio of said pitch distance to a thickness of said bump foil is between 25 and 60, and a ratio of the first radius of curvature to the radius of the shaft is between 0.02 and 0.08; and a wedge step distance is defined between the top and intermediate foils, a ratio of the pitch distance of the corrugation of the bump foil to this wedge step is between 6 and 17.

6. The shaft sub-assembly as set forth in claim 5, wherein the ratio of said first radius of curvature to the second radius of curvature being between 0.6 and 4.

7. An air machine comprising:

a compressor rotor, said compressor rotor being connected to rotate with a turbine rotor, an outlet of said compressor rotor passing at least a portion of air over the turbine rotor;

a shaft rotating with the turbine rotor and supported within a journal sleeve, said journal sleeve including a foil assembly intermediate an outer periphery of said shaft and an inner periphery of said journal sleeve, said journal sleeve also including a key slot;

the foil assembly including a top foil, an intermediate foil, and a bump foil, the bump foil including a plurality of circumferentially spaced corrugations, and the bump foil having a bend end received within said key slot, said top and intermediate foils having a bent portion extending radially outwardly into said key slot, and there being a first radius of curvature to a curved portion of the bent portion at a first end adjacent to said bent end, and a second radius of curvature at an end of said bent portion on an end opposed to said bent end, with a ratio of said first radius of curvature to the second radius of curvature being between 0.6 and 10;

a pitch distance of the corrugations in the bump foil is defined, and a ratio of the pitch distance to a radius of the shaft is between 0.25 and 0.7;

a ratio of said pitch distance to a thickness of said bump foil is between 25 and 60;

a ratio of the first radius of curvature to the radius of the shaft is between 0.02 and 0.08; and a wedge step distance is defined between the top and intermediate foils, a ratio of the pitch distance of the corrugation of the bump foil to this wedge step is between 6 and 17.

8. The air machine as set forth in claim 7, wherein the ratio of said first radius of curvature to the second radius of curvature being between 0.6 and 4.

9. A method of assembling a bearing into an air machine comprising the steps of:

inserting a bearing sleeve, the bearing sleeve having a foil assembly including a top foil, an intermediate foil and a bump foil in an inner periphery of the bearing sleeve, said bump foil having a bend end that is bent radially outwardly into a key slot in the bearing sleeve, and said top and intermediate foils having a bent portion extending radially outwardly, and positioned in said key slot, and there being a first radius of curvature to a curved portion leading into the bend portion at a first end adjacent to said bend end, and a second radius of curvature of an end of said bent portion on an end opposed to said bend end, with a ratio of said first radius of curvature to the second radius of curvature being between 0.6 and 10;

a pitch distance of the corrugations in the bump foil is defined, and a ratio of the pitch distance to a radius of the shaft is between 0.25 and 0.7;

a ratio of said pitch distance to a thickness of said bump foil is between 25 and 60;

a ratio of the first radius of curvature to the radius of the shaft is between 0.02 and 0.08; and a wedge step distance is defined between the top and intermediate foils, a ratio of the pitch distance of the corrugation of the bump foil to this wedge step is between 6 and 17.

10. The method as set forth in claim 9, wherein the ratio of said first radius of curvature to the second radius of curvature being between 0.6 and 4.

* * * * *

UNITED STATES PATENT AND TRADEMARK OFFICE
CERTIFICATE OF CORRECTION

| | |
|---|---|
| PATENT NO. | : 8,807,921 B2 |
| APPLICATION NO. | : 13/079312 |
| DATED | : August 19, 2014 |
| INVENTOR(S) | : Ronald M. Struziak |

It is certified that error appears in the above-identified patent and that said Letters Patent is hereby corrected as shown below:

IN THE CLAIMS:

In claim 3, column 4, line 58; delete "bum" and replace with --bump--

In claim 3, column 4, line 58; after "this" add --wedge step--

Signed and Sealed this
Second Day of December, 2014

Michelle K. Lee
*Deputy Director of the United States Patent and Trademark Office*